United States Patent [19]

Evetts

[11] 4,285,616
[45] Aug. 25, 1981

[54] ROLL COMPRESSION MEMBER

[76] Inventor: Jonathan Evetts, 35 Tulip Ct., Burlingame, Calif. 94010

[21] Appl. No.: 59,850

[22] Filed: Jul. 23, 1979

[51] Int. Cl.³ .............................................. E02S 3/22
[52] U.S. Cl. ................................... 405/215; 114/219; 267/141; 267/153
[58] Field of Search ....................... 405/212, 213, 215; 267/141, 140.2, 140, 153; 114/219

[56] References Cited

U.S. PATENT DOCUMENTS

| | | |
|---|---|---|
| 2,713,483 | 7/1955 | Tillou . |
| 3,049,344 | 8/1962 | Hawkins ............................. 267/141 |
| 3,269,717 | 8/1966 | Beck .................................... 267/141 |
| 3,305,227 | 2/1967 | Henley ................................. 267/141 |
| 3,315,951 | 4/1967 | Boschi et al. ........................ 267/141 |
| 3,507,123 | 4/1970 | Miura . |
| 3,575,403 | 4/1971 | Hamel .................................. 267/63 |
| 3,677,017 | 7/1972 | Shirvany .............................. 267/140 |
| 3,763,653 | 10/1973 | Shirvany . |
| 3,798,916 | 3/1974 | Schuenner ....................... 114/219 X |
| 3,820,495 | 6/1974 | Ueda . |
| 3,999,497 | 12/1976 | Hamel ................................. 405/212 |

FOREIGN PATENT DOCUMENTS 2011579  7/1979  United Kingdom .................... 267/153

Primary Examiner—William F. Tate, III
Attorney, Agent, or Firm—Townsend and Townsend

[57] ABSTRACT

The disclosed invention is an elastomeric compression member having particular utility as a marine fender. It is comprised of two elastomeric offset legs joined at the knee and extending therefrom in opposite directions. When compressive forces are applied to the feet of the member, the member initially compresses by roll compression, where the two legs roll around the knee to provide the member with an overall cylindrical configuration. After roll compression is complete, snub compression, compression of the resulting cylinder occurs.

6 Claims, 12 Drawing Figures

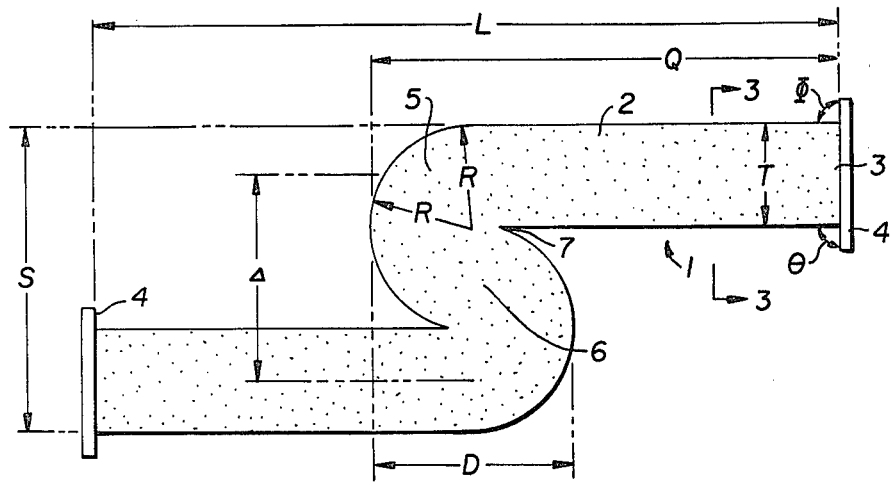
FIG._1.
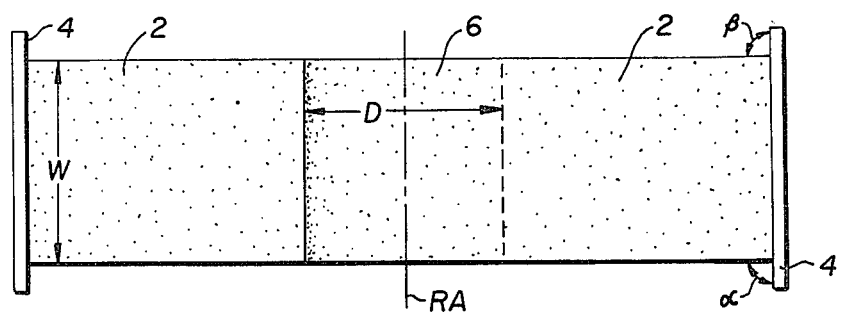
FIG._2.
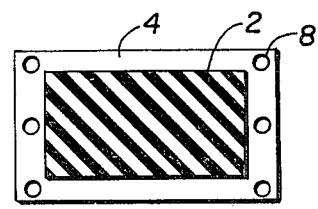
FIG._3.

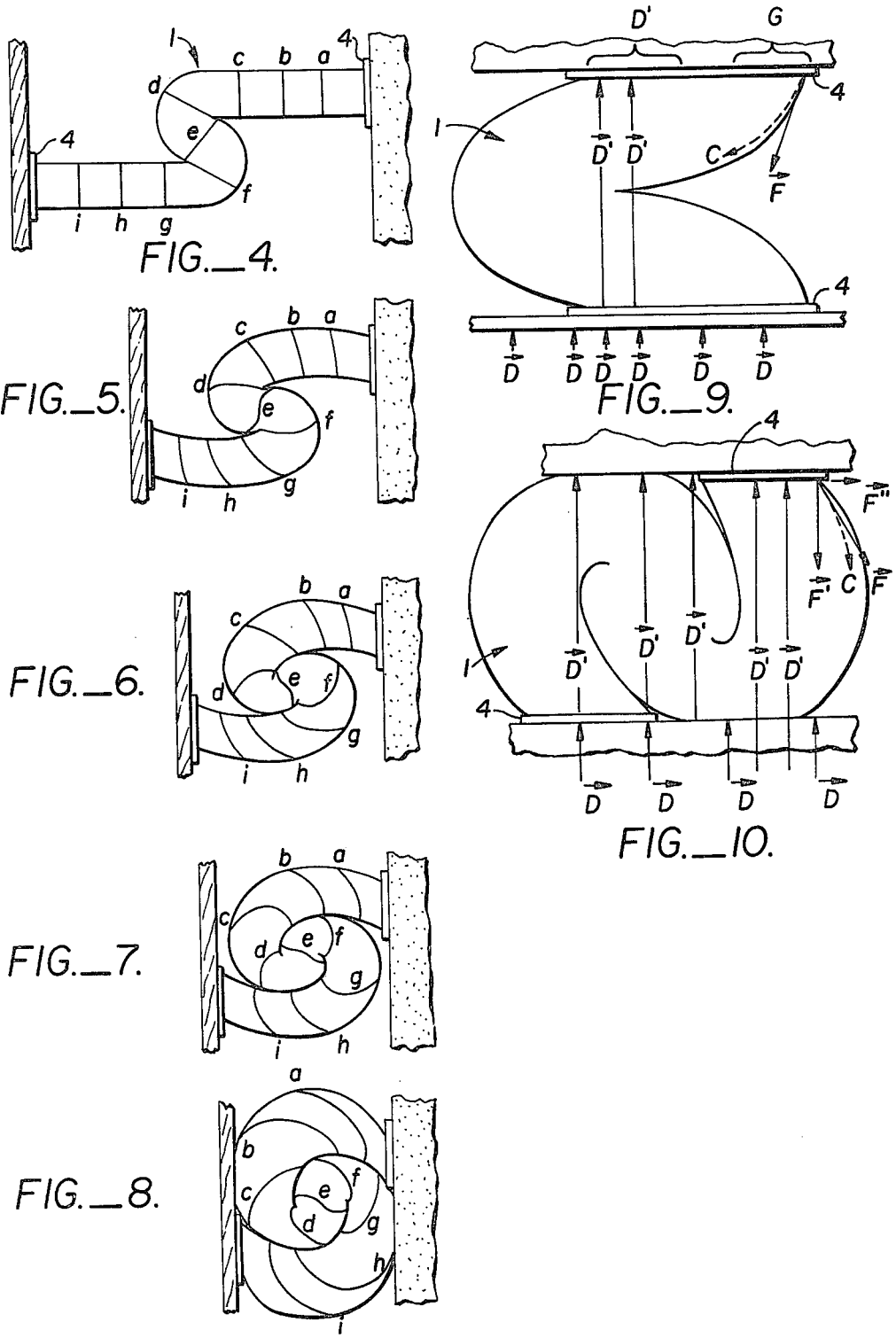

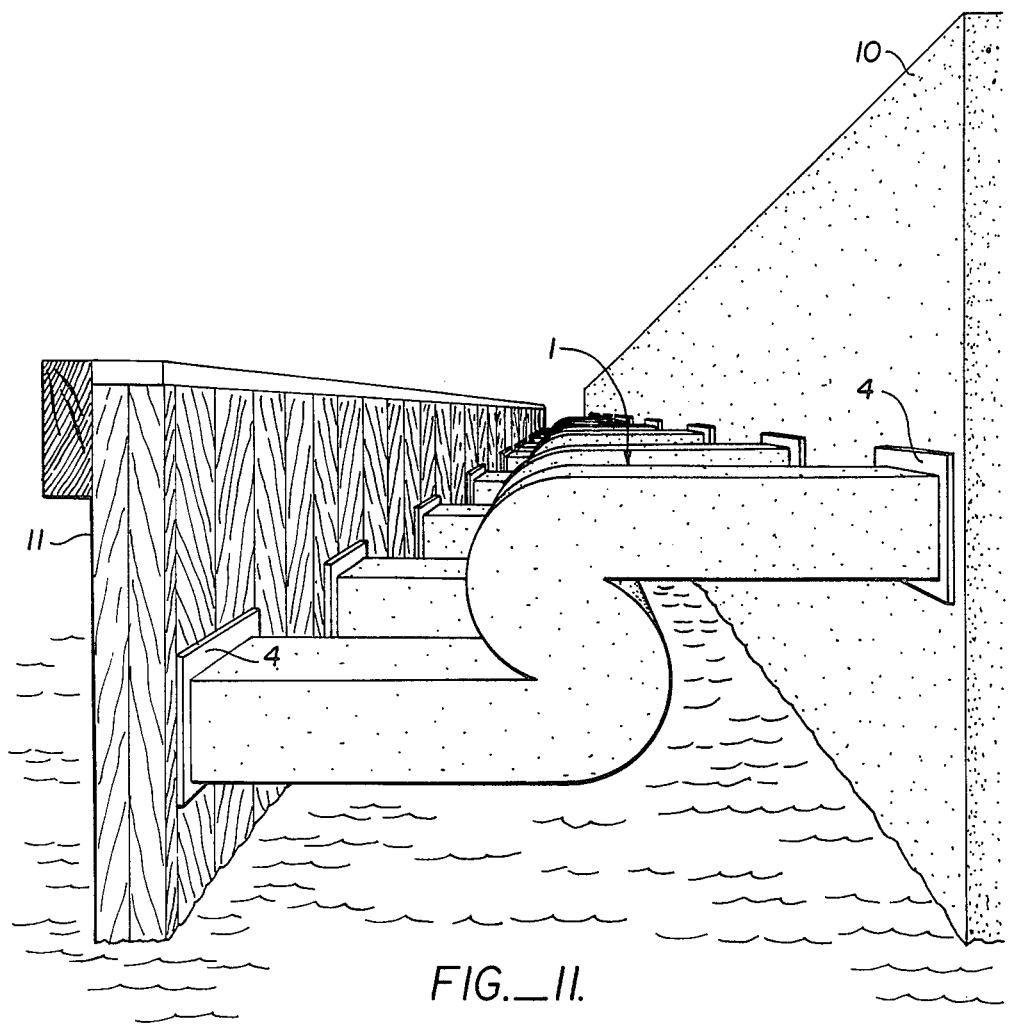
FIG.\_11.
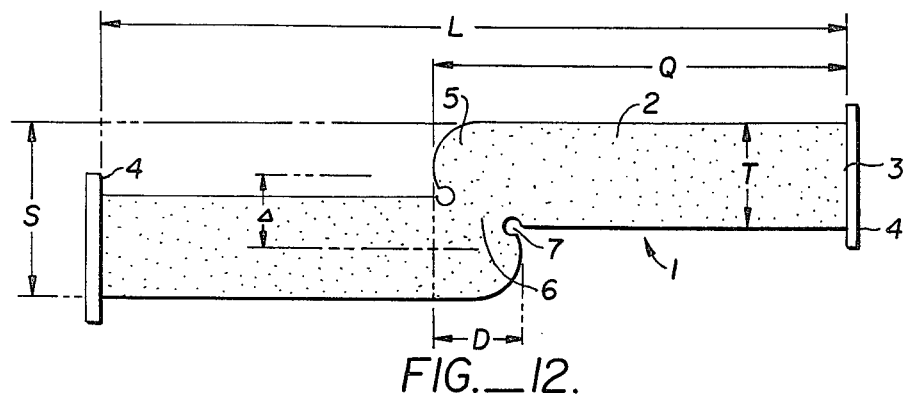
FIG.\_12.

ROLL COMPRESSION MEMBER

BACKGROUND OF THE INVENTION

1. Field of the Invention

The present invention relates to elastomeric compression members having particular utility as marine fenders.

2. Summary of the Prior Art

Nearly as long as ships have docked adjacent to piers, marine fender compression members have been utilized to protect both the ship and the pier. However, the development of a compression member having the desirable characteristics of a marine fender (high compressibility, high energy absorbance and high durability) has not been such an easy matter.

One compression member which has been particularly developed for use as a marine fender is a column attached to two mounting plates which buckles to the side when compressed. Such a "buckling column" marine fender is described in U.S. Pat. No. Re. 27,318 as well as in U.S. Pat. No. 3,677,017. However, since this fender buckles only with extreme stretching and distortion of the elastomeric substance near its attachment to the mounting plate, there is a tendency for the elastomer to disbond from the mounting plate.

Another compression member is a collapsing-type consisting of a central elastomeric area with four elastomeric spokes, two spokes attached to each mounting plate, and is shown in U.S. Pat. No. 3,269,717. This compression member has a similar disbonding tendency, as the spokes undergo sideways stretching in the direction of the central area upon compression. Furthermore, compression in this member is over a relatively short distance, and the member tends to collapse rather than compress or roll under stress.

SUMMARY OF THE INVENTION

The elastomeric compression member of the present invention, however, provides significant advantages for use as a marine fender and minimizes any disbonding tendencies.

The compression member of the present invention is comprised of two substantially elastomeric offset legs joined at the knee and extending therefrom in opposite directions. The member is aligned so that the compressive forces are applied to one or both "feet" of the member to produce endwise compression. Initially, this compression is in the form of "roll compression", where the two legs roll around the knees to provide the member with an overall cylindrical configuration. After roll compression is complete, "snub compression", compression of the resulting cylinder, occurs.

The initial roll compression provides compression over a substantial distance with high energy absorbance. During roll compression, distortion of the elastomeric substance is distributed over the entire member rather than concentrated at certain areas. Thus, severe strain on the compression member in certain areas is minimized as well as disbonding tendencies due to extreme distortion of the member near its attachment to the mounting plates.

The snub compression which follows roll compression essentially consists of compression of the elastomeric element of the reslting cylinder. It prevents "bottoming out" of the member following initial compression and further minimizes disbonding tendencies, as distortion of the elastomeric substance near the mounting plate is minimized and stresses tending to cause disbonding are counteracted by forces resulting from compression.

All in all, the compression member of the present invention provides significant advantages of particular importance when it is utilized as a marine fender; it provides compression over a substantial distance with high energy absorbance even during snubbing. Furthermore, distortion of the elastomeric substance is distributed throughout the member during compression, and disbonding tendencies are minimized.

BRIEF DESCRIPTION OF THE DRAWINGS

FIG. 1 is a side elevation of one embodiment of the roll compression member of the present invention.

FIG. 2 is a plan view of the FIG. 1 embodiment of the present invention.

FIG. 3 is a cross-section of the FIG. 1 embodiment of the roll-compression member of the present invention taken at lines 3—3 of FIG. 1. It particularly illustrates the mounting plate and the position of attachment of the leg to the mounting plate.

FIGS. 4, 5, 6, 7, and 8 are side elevations of an embodiment of the present invention showing schematically the roll-compression member in operation. They illustrate the compression member at rest, under 65% compression, under 84% compression, under full roll compression, and under snub compression, respectively. The "distortion lines" diagrammed on the surface of the compression member illustrate generally the relative displacement of the elastomeric substance when the member undergoes compression.

FIG. 9 is a schematic diagram of a prior art compression member which buckles or collapses sideways near the mounting plate when under compression. The diagram illustrates the disbonding tendencies besetting such prior compression members.

FIG. 10 is a side elevation of an embodiment of the present invention taken near the mounting plate and illustrates how disbonding tendencies are minimized in the present invention.

FIG. 11 is a perspective view of a series of compression members of the present invention aligned to provide a marine fender unit.

FIG. 12 is a side elevation of another embodiment of the compression member of the present invention illustrating a configuration with different preferred proportions.

DESCRIPTION OF THE SPECIFIC EMBODIMENTS

The compression member of the present invention is comprised of two substantially elastomeric offset legs joined at the knee and extending therefrom in opposite directions. The member is aligned so that compressive forces are applied to one or both feet of the member to produce endwise compression. Initially, this compression is in the form of roll compression, where the two legs roll around the knees to provide the member with an overall cylindrical configuration. After roll compression is complete, snub compression, compression of the elastomeric substance in the resultant cylinder, occurs.

A side view of one embodiment of the invention before compression is illustrated in FIG. 1. The compression member 1 is comprised of two offset legs 2 joined at their knees 5 to form a barrel portion 6. The compression member is composed of an elastomeric substance which preferably possesses good rebound characteristics and is resistant to tearing and weathering as well as petrochemicals and salt water. The compression member can conveniently be molded of conventional marine fender elastomers such as polybutadiene styrene rubber, and can be provided with a multilayer construction. Additionally, it can be reinforced with auxilliary fillets of fiberglass, spring steel, or other flexible material to provide stiffening at selected locations. For example, spring steel fillets can be mounted at the sides of the legs to provide increased energy absorption during the roll and snub compression stages.

The legs 2 extend in opposite directions from the barrel 6 and are attached at their feet 3 to mounting plates 4. The mounting plates 4 are preferably of flat or perforate steel and the elastomer is usually bonded to them.

FIG. 3 is a cross-section of the FIG. 1 embodiment of the member taken at lines 3—3 of FIG. 1. The cross-hatched area indicates the leg 2 itself in relation to the mounting plate 4. The mounting plates 4 provide means by which the member can be attached, preferably by bolts through apertures 8, to adjacent structures.

FIG. 2 is a plan view of the FIG. 1 embodiment of the compression member, illustrating the legs 2 and the barrel portion 6 having a length D. Upon compression the member rolls about roll axis RA, the legs spiralling around the barrel portion to provide an overall cylindrical configuration to the member. Roll axis RA is preferably aligned horizontally when the member is used as a marine fender.

For a particularly effective marine fender unit, a series of roll compression members 1 are generally utilized as illustrated in FIG. 11. Each member 1 is attached by one mounting plate to the pier 10 and by the other mounting plate to a frontal structure 11 which is movable toward the pier, being either suspended from above or supported from beneath.

FIGS. 4–8 illustrate schematically the compression member in operation. FIG. 4 illustrates the compression member before compression, with distortion lines a–i diagrammed on the surface to illustrate the natural position of the elastomeric substance before compression.

FIG. 5 illustrates the compression member under about 65% compression. It is beginning to roll and the elastomeric substance is undergoing some distortion throughout as generally illustrated by the changed position of each of the distortion lines. In FIG. 6, the compression member is under about 84% compression and in FIG. 7 it has formed a fairly compact, substantially airtight cylinder under full roll compression. As FIGS. 5–7 illustrate, the position of each distortion line has changed, and the elastomeric distortion of the member is distributed relatively evenly throughout the entire compression member; consequently there is a reduced tendency for pockets of extreme compression or areas of extreme elongation to develop near the mounting plate or elsewhere in the member. As shown by FIG. 7, also, the length of compression of this embodiment of the member under roll-compression is substantial.

FIG. 8 illustrates the compression member of the present invention under snub compression. The member has rolled into a fairly compact cylinder upon completion of roll compression. Further compression produces compression of the elastomeric substance of the resulting cylinder. This compression is distributed throughout the cylinder, and the cylinder expands primarily in the direction shown by the arrows. This subsequent elastomeric compression of the cylinder provides high energy absorption even after full roll compression, and prevents abrupt bottoming out so as to provide adequate overload protection.

Although the configuration of this compression member can vary, the preferred embodiments of the invention have the configuration and proportions shown in FIGS. 1–3 or 12. Referring specifically to FIGS. 1–3, the following symbols are used for convenient representation of the proportions of the preferred embodiments:

$\Delta$—Represents the distance between the center lines of the two legs, and is a measure of the amount by which the legs are offset from each other.

T—represents the thickness (or height) of a leg.

Q—represents the length of a single leg from foot to knee.

D—represents the distance from knee peak to knee peak, or the length of the barrel portion.

S—represents the overall height (or thickness) of the member.

L—represents the overall length of the member from foot to foot.

R—represents the radius of a knee.

$\theta$—represents the angle between the shorter side of a leg and the mounting plate.

$\phi$—represents the angle between the longer side of a leg and the mounting plate.

$\alpha$—represents the angle between one of the two equal-length sides of a leg and the mounting plate.

$\beta$—represents the angle between the other equal-length side of a leg and the mounting plate.

Naturally, in any embodiment of the invention, the offset between the legs, $\Delta$, must be greater than zero in order to obtain roll compression. The preferred ratio of the offset, $\Delta$, to the leg thickness, T is in the range of about 0.75:1.0 to 2:1; where the $\Delta$ to T ratio is very small or very large, the member may tend to collapse rather than roll on compression. In the FIG. 1 embodiment the $\Delta$ to T ratio is about 2 to 1. Preliminary testing of this embodiment however, has shown some indication of "sloppyness" in the early stages of compression. As a result, it may be desirable to provide a smaller $\Delta$ to T ratio in order to stiffen the unit under initial compression and enable it to absorb energy more evenly during the entire energy absorbtion cycle. A $\Delta$ to T ratio of about 0.75:1 is illustrated in FIG. 12.

Referring again to FIG. 1, a notch, 7, is preferably provided where the knee of each leg joins the other leg. This facilitates roll-compression into a cylinder. Where a fairly small $\Delta$ to T ratio is provided, it may be desirable to provide an enlarged notch, 7, as shown in FIG. 12 to enhance initiation of roll compression.

Additionally, in the preferred embodiments the length of the legs, Q, are substantially identical, and R is of a uniform size so as to provide fairly uniform stiffness throughout compression. In the FIG. 1 embodiment, the legs have a substantially uniform cross-section throughout and R is about 0.7 to 0.8 times the leg thickness, T. This results in a fairly uniform, compact cylinder on roll-compression, so that upon snubbing the cylinder compresses evenly and uniformly with high energy absorbance and does not tend to collapse in certain areas. In certain embodiments, the legs may be "relieved" by grooves or other apertures to facilitate initiation of roll compression, especially where the $\Delta$ to T ratio is fairly small, or to control or facilitate other types of movement. Generally, the barrel is solid throughout, but in some embodiments it too can be "relieved" by apertures or the like to promote initiation of roll compression or to control or promote other movement. Furthermore, the leg width, W, is usually fairly large relative to the leg thickness, T, to minimize any tendency of the column to buckle sideways rather than roll under compression. In the preferred embodiment of FIG. 1, the W:T ratio is about 2:1.

In order to obtain a substantial length of compression, the ratio of leg length, Q, to the barrel portion length, D, is usually moderately large. In the FIG. 1 embodiment, the Q:D ratio is in the vicinity of 2:1, so that the member compresses to at least about one-half its original length during roll-compression. Additionally, in the FIG. 1 embodiment, the ratio of the member's entire length, L, to its entire height, S, is about 5 to 2 and the ratio of overall height, S, to the leg thickness, T, is about 2 to 1. Finally, in the preferred embodiments, angles $\theta$, $\phi$, $\alpha$, and $\beta$ are preferably about 90°.

A particular advantage of the roll compression member of the present invention is that its configuration allows snub compression with high energy absorbance relatively unaccompanied by disbonding tendencies. This is illustrated in FIGS. 9 and 10.

FIG. 9 is a generalized diagram of a prior art compression member 1 near the mounting plate 4 after initial compression. The forces of compression, $\vec{D}$ generally tend to cause elastomeric compression of the member with corresponding lateral expansion of the member. They are believed to be transmitted through the elastomeric substance so as to result in a force $\vec{D}'$ acting on the bond the bond between the elastomer and the mounting plate largely in area D'. Simultaneously, the elastomeric substance of the member undergoes relatively great distortion elsewhere near the bond to the mounting plates, particularly in the form of elongation and deformation in the direction labelled C. This appears to result in a great deal of strain on the elastomeric substance in the area of deformation, and if the strain is large enough, tearing of the member may occur.

Alternately, and more commonly, this deformation may result in disbonding of the elastomer from the mounting plate. The deformation C generally results in a stress $\vec{F}$ on the bond between the elastomer and the mounting plate generally in area G. Naturally, the greater the amount of deformation, the greater the stress $\vec{F}$, and when $\vec{F}$ is greater than the bonding forces in area G, the elastomer will tend to disbond from the mounting plate.

In the roll compression member of the present invention, however, such tearing and disbonding tendencies are minimized. This is illustrated in FIG. 10, showing the compression member under snub compression. The forces of compression, $\vec{D}$, result in snubbing of the entire elastomeric cylinder, with corresponding lateral expansion of the cylinder. They are transmitted through the elastomer so as to result in forces $\vec{D}'$ acting largely on the entire bonding area between the elastomer and the mounting plate.

Simultaneously, any elongation and deformation of the elastomeric substance which does occur near the mounting plate tends to be in the direction labelled C in FIG. 10. This deformation C results in stress $\vec{F}$ on the bonding area. This stress $\vec{F}$ can be resolved into two components, $\vec{F}''$ lateral to the mounting plate and $\vec{F}'$ perpendicular to and away from the mounting plate.

As was shown in FIGS. 7 and 8, distortion of the elastomeric substance in the present invention tends to be distributed relatively evenly throughout the member so that the amount of deformation and elongation, C, of the elastomeric substance which does occur near the mounting plate is minimized. Consequently, the strain on the elastomer in the area of deformation is minimized and so is the likelihood of tearing. Correspondingly, the resulting stress $\vec{F}$ on the bonding area is also minimized.

Furthermore, the compressive forces $\vec{D}'$ themselves are opposite in direction to the component of stress $\vec{F}'$. They therefore counteract $\vec{F}'$ and minimize the resulting overall stress $\vec{F}$. Since stress $\vec{F}$ is reduced, so are any tendencies of the member to disbond. Consequently, the roll-compression member of the present invention possesses high compressibility and high energy absorbance relatively unaccompanied by disbonding tendencies and is especially suited for use as a marine fender.

Naturally, the above description is intended by way of illustration, and is not to be taken by way of limitation, and many variations can be made within the scope of the invention.

What is claimed is:

1. An elastomeric compression member for separating two surface members, comprising:
    first and second parallel, transversely spaced apart elongate leg portions having outer and inner ends, said leg portions extending generally at right angles from said surface members with said outer ends abutting said surface members;
    said leg portions spaced-apart by a distance $\Delta$;
    said leg portions having lengths L, a first dimension T taken parallel to said distance $\Delta$ and a second dimension W taken perpendicular to said first dimension T, said legth L being substantially greater than said first dimension T;
    a generally S-shaped connecting portion coupling said inner ends of said leg portions;
    whereby when said surface members are brought together, said compression member compresses by rolling said leg portions around said connecting portion.

2. The compression member of claim 1 wherein the ratio between said distance $\Delta$ and said thickness T is about 0.75:1.0 to about 2:1, whereby the tendency of said leg portions to roll about said connecting portions is enhanced.

3. The compression member of claim 2 wherein said second dimension W is larger than said first dimension T.

4. The compression member of claim 1 wherein said second dimension W is at least twice as great as said first dimension T.

5. A elastomeric compression member for separating two surface members, comprising:
    first and second parallel, transversely spaced-apart elongate leg portions having outer and inner ends, said leg portions extending generally normally from said surface members with said outer ends abutting said surface members;
    said leg portions having lengths L, a first dimension T taken parallel to said distance $\Delta$ and a second dimension W taken perpendicular to first dimension T, said length L being subtantially greater than said first dimension T and said second dimension W being at least twice as great as said first dimension T, the ratio between said distance $\Delta$ and said thickness T being about 0.75:1.0 to about 2:1;
    a generally S-shaped connecting portion coupling said inner ends of said leg portions;

whereby when said surface members are brought together, said compresson member compresses by rolling said leg portions around said connecting portion.

6. A marine fender for use adjacent a marine structure such as a pier or wharf, comprising:
a frontal structure;
an elastromeric compression member for mounting between said frontal structure and said pier, said compression member comprising:
a pair of parallel, transversely spaced-apart elongate leg portions, said leg portions having inwardly facing opposed inner ends and outwardly facing outer ends, said opposed inner ends separated by a distance Z, said leg portions spaced-apart by a distance $\Delta$;
said leg portions having lengths L, thicknesses T taken perpendicular to said distance $\Delta$ and widths W taken perpendicular to said thickness T, said width W being substantially larger than said thickness T, said length L being substantially larger than said thickness T, the ratio between said distance and said thickness T being about 0.75:1.0 to about 2:1; and
a generally S-shaped connecting portion coupling said inner ends of said leg portions; and
means for attaching one said outer end to said pier and the other said outer end to said frontal structure so said leg portions extend generally normally between said pier and said frontal structure;
whereby when said frontal structure is forced toward said pier, said compression member compresses by rolling said leg portions around said connecting portion until said compression member assumes a generally cylindrical configuration, after which further compression of said compression member causes the cylindrically configured compression member to flatten out somewhat between said pier and said frontal structure.

* * * * *